United States Patent Office 3,565,733
Patented Feb. 23, 1971

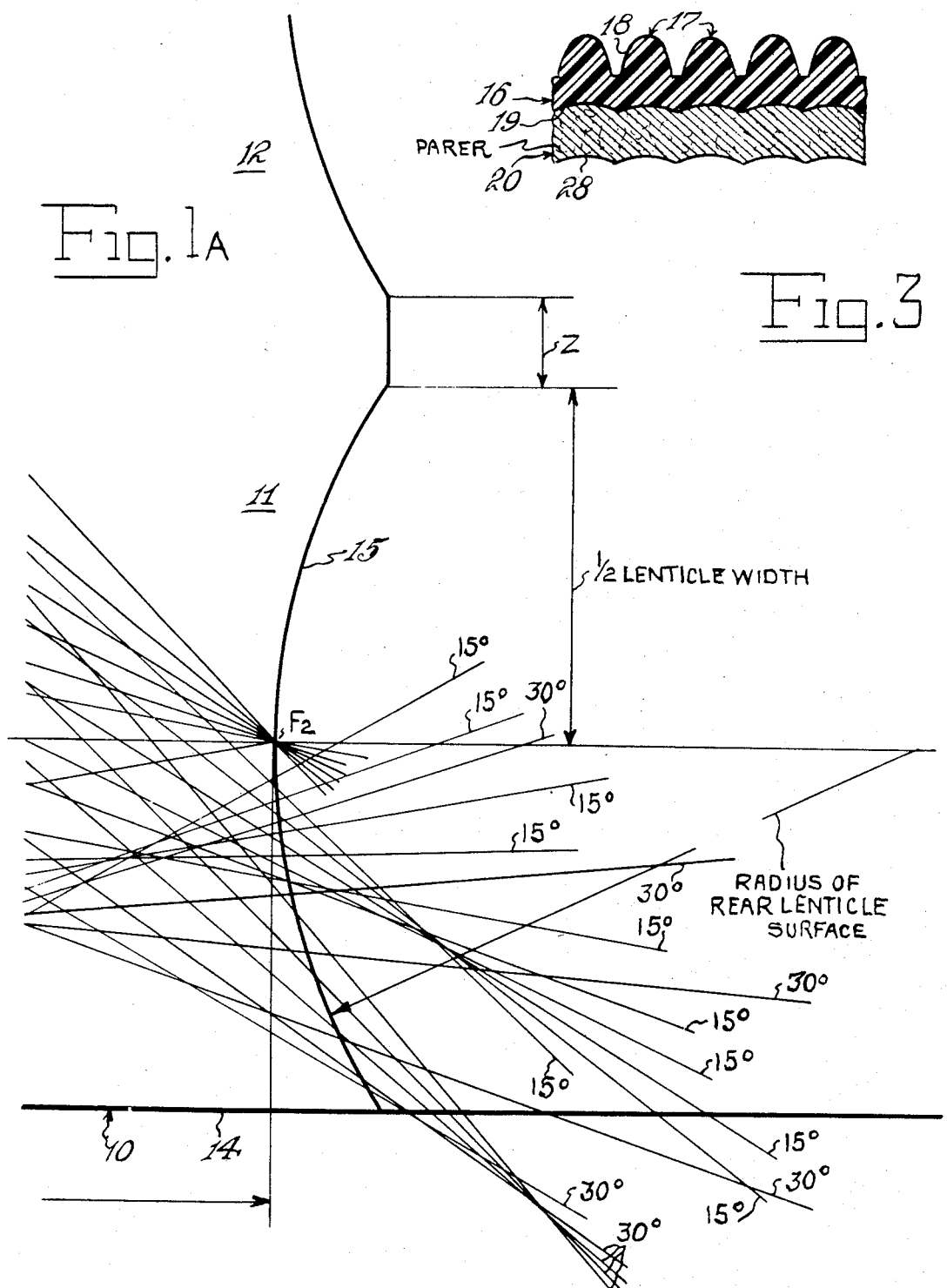

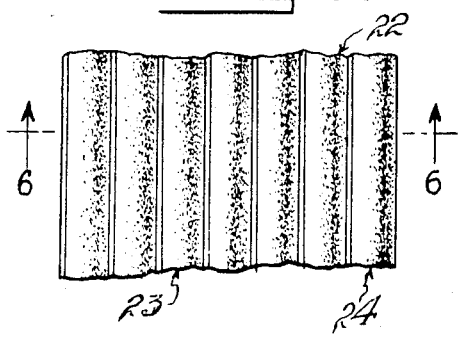
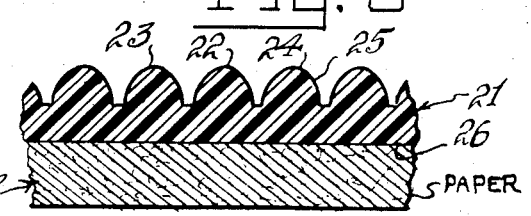
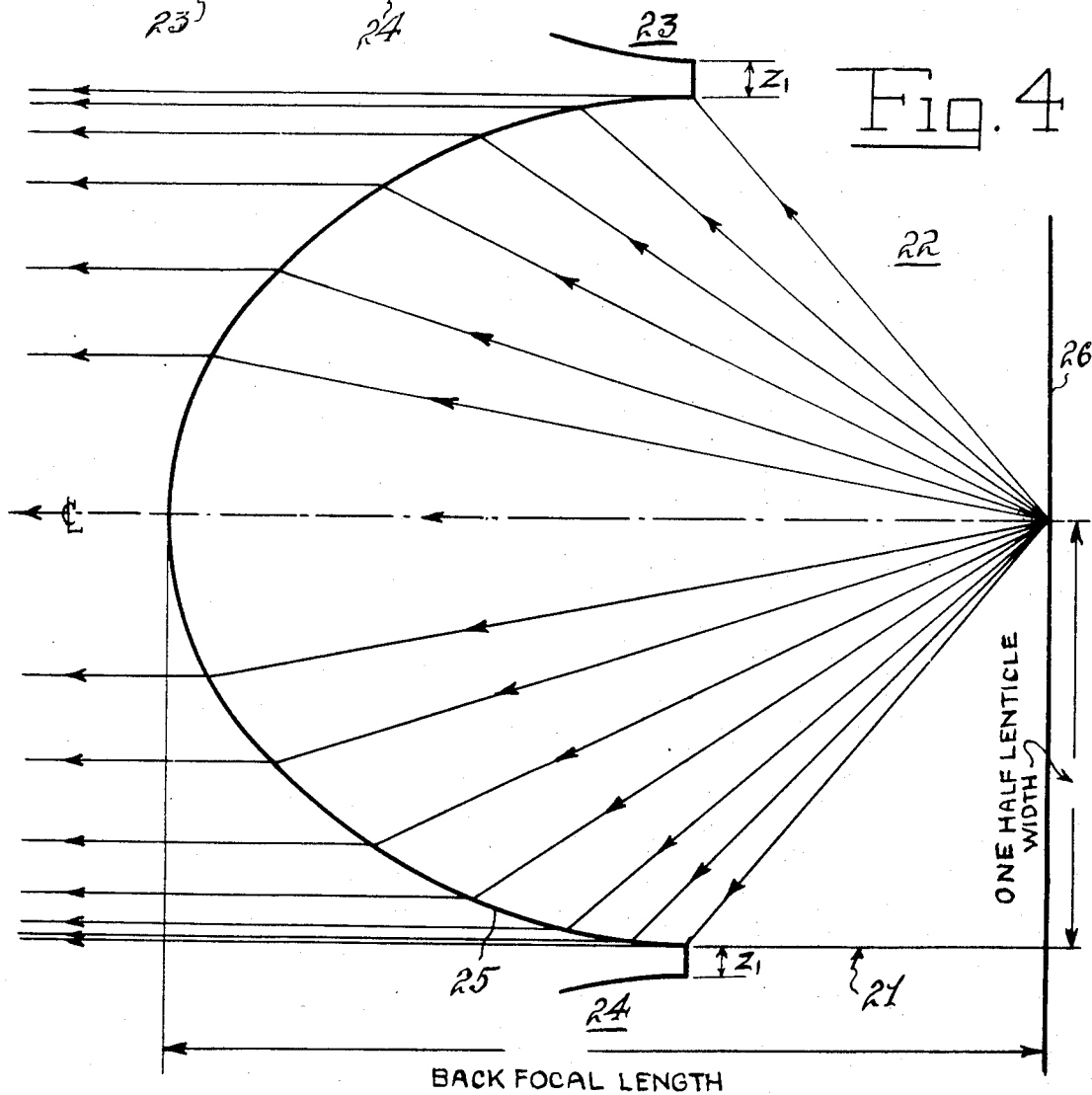

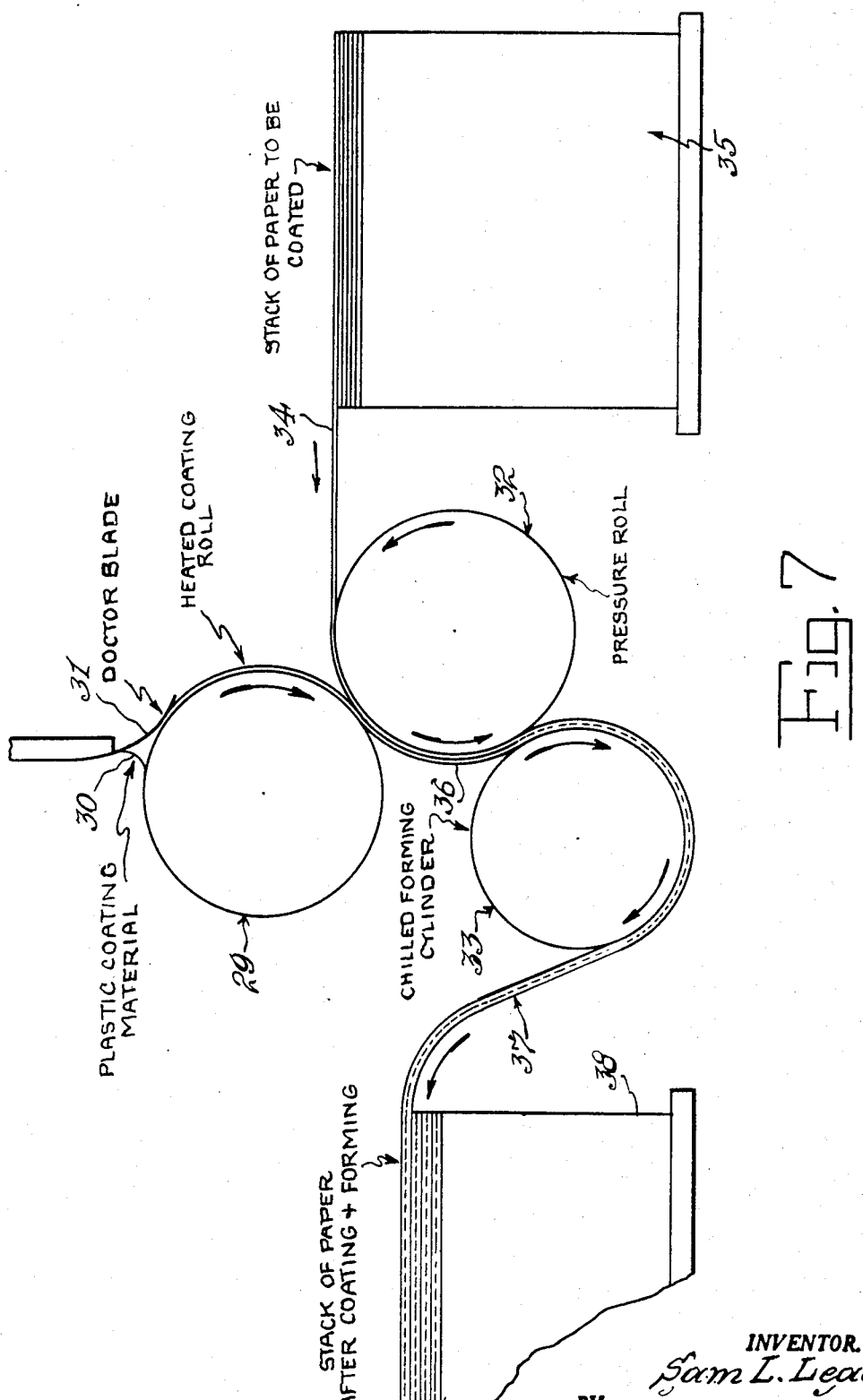

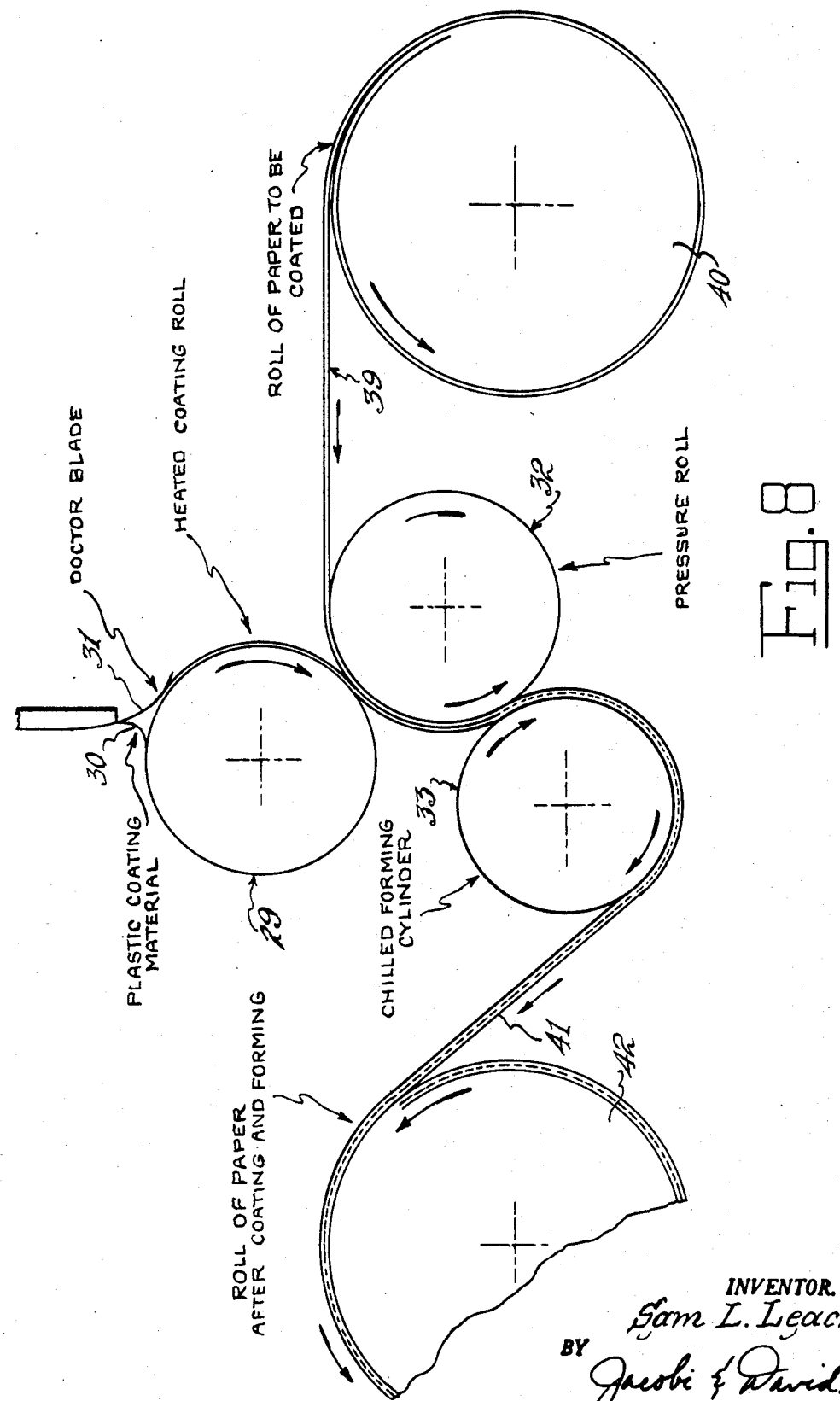

---

3,565,733
THIN FLEXIBLE LENTICULAR SCREEN UNIT
Sam L. Leach, 32653 Seagate Drive,
Palos Verdes Peninsula, Calif. 90274
Application Jan. 30, 1961, Ser. No. 85,608, which is a continuation-in-part of application Ser. No. 582,503, May 3, 1956. Divided and this application June 29, 1967, Ser. No. 649,901
Int. Cl. B44f 1/02; G03b 21/60
U.S. Cl. 161—2                                   8 Claims

---

ABSTRACT OF THE DISCLOSURE

A thin flexible lenticular screen unit including a plastic screen having aspherically curved lenticles formed on the forward surface thereof and a backing sheet adhered to the rearward surface thereof. The lenticles of the screen are spaced apart from one another by a predetermined distance and the viewing angle of each lenticle is maximized.

---

Figure 1:
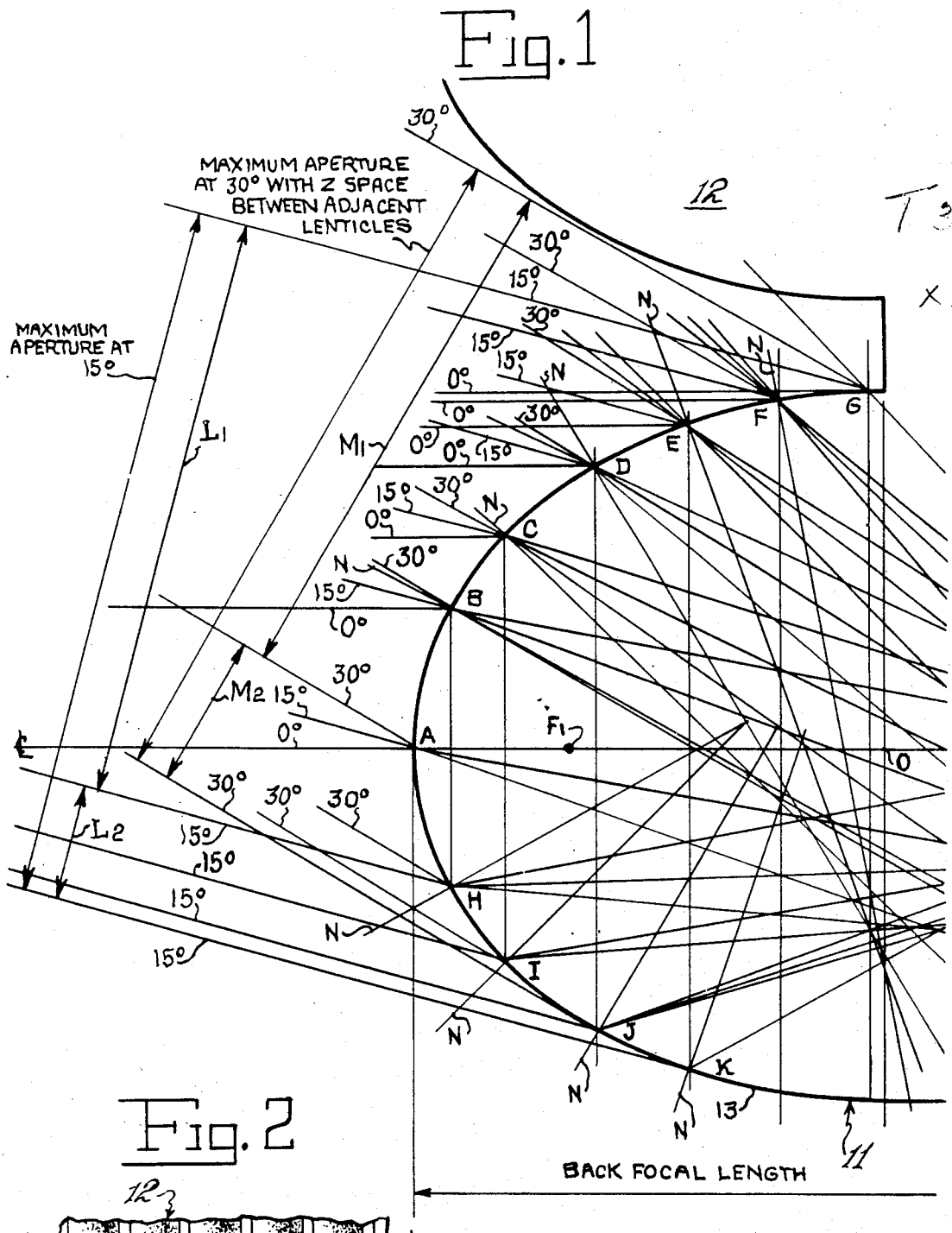

This application is a division of my co-pending application Ser. No. 85,608, filed Jan. 30, 1961, now abandoned, as a continuation-in-part of my earlier application Ser. No. 582,503, filed May 3, 1956 and now abandoned.

This invention relates to optics and more particularly to the provision of a paper thin flexible lenticular screen which is fully corrected for spherical aberration and provides a wide viewing angle as compared to the viewing angle of conventional lenticular screens.

As is well known, a lenticular screen is in reality nothing more than a plurality of lenses arranged in side-by-side relationship and in which each lens, commonly termed a lenticle, may be formed by an elongated convex surface or by a circular convex surface, these lenses being provided with a flat rear surface. In the instant case, each lenticle is provided by an elongated front surface which serves to provide a plurality of elongated parallel lenticles and in one form of the invention a curved rear surface to the rear of each lenticle is provided and in another form, a flat surface to the rear of each lenticle is provided. In conventional lenticular screens there is no spacing between adjacent lenticles, that is the curve of one lens or lenticle starts from the termination of the curve of the adjacent lenticle. With a structure of this type adjacent lenticles tend to interfere or obstruct the passage of light rays to and from the lenticle at relatively wide angle from the optical axis and furthermore, the area or space to the rear of the lenticle which is available for receiving image information is limited by the width of the lenticle. Furthermore, present day lenticular screens are relatively thick and rigid and consequently are not usable where a thin highly flexible member is required.

It has been found that three dimensional or stereoscopic photographs for many purposes, such as portraits, merchadise labels, advertising or for illustrative purposes may be made by exposing a photographic film in a suitable manner through a lenticular screen and when the resulting photograph is viewed through a lenticular screen having suitable optical characteristics the picture will appear to have three dimensional or stereoscopic characteristics. With the use of this technique in connection with photographs to be framed or otherwise utilized where thickness of the photograph is of no great importance, the problems are not too difficult to solve, but where it is desired to use such photographs as cover material or for other portions of a magazine or other publication, obviously the question of flexibility, resistance to abrasion or other forms of damage, ease of manufacture and the production of a clear sharp image at relatively wide viewing angles represent problems which are exceeding difficult of solution and as a result it has heretofore been practically impossible to utilize this technique in connection with photographs or printed images for such purposes.

The production of lenticular screens in which the lenses are of relatively long focal length is a comparatively simple and economical process and since a long focal length lens is perfectly suitable for use in the lenticular screen utilized for taking the photograph to be later utilized as a three dimensional picture, such screens with relatively long focal length lenses are utilized for this purpose. However, a long focal length lens necessarily provides a restricted viewing angle and consequently, such a lens is not suitable for use in the viewing screen which is provided for viewing the photograph and consequently, the lenticular screen for this purpose must be formed with lenses of relatively short focal length which provide a relatively wide viewing angle and the difficulties of forming such a screen, particularly with the lenses of short focal length, completely corrected for spherical aberration are many and complex, but by the use of the present invention it has been possible to overcome these difficulties and produce lenticular screens of this nature having the desired properties, such as flexibility wide viewing angle and correct for spherical aberration at a relatively low cost and in large production quantities thereby permitting the use of this invention in publications, greeting cards and the like.

While it is to be noted that attempts have previously been made to correct the lenses of lenticular screens for spherical aberration, it should also be noted that these attempts have all been made in connection with lenticular screens having lenses of relatively long focal length and in which the screen was relatively thick and non-flexible and consequently, the problems were considerably less complex and difficult to solve than is the case with lenticular screens having lenses of relatively short focal length of the order of not greater than .020 inch. The problems connected with the manufacture of a suitable lenticular screen of the type mentioned above are further magnified by the fact that in order to provide sufficient flexibility to permit use of the screen in the applications desired, the maximum thickness thereof may not be greater than .020 inch and consequently there is very little material available for accurately forming the lenses and correcting the same for spherical aberration and furthermore, the nature of the lenticular screen utilized and the application thereof necessarily requires that the correction for spherical aberration be made only on the front surface of the lens.

By the present invention, however, there is provided a lenticular screen which overcomes all of these difficulties and which is susceptible of high speed and high volume production which results in a product of sufficiently high quality and low cost as to be suitable for use in the field of magazines or other publications, as well as greeting cards and as is well known in these fields, production costs must be maintained at a minimum.

It has been found that a photograph printed on a conventional sensitized printing paper or a photograph reproduced by a conventional half-tone printing process may be utilized in connection with the lenticular screen of this invention to provide a three dimensional or stereoscopic photograph and it has further been found that the photograph or printed image may be coated with a suitable plastic which is then embossed on the outer surface to provide a lenticular screen having all of the necessary and desirable characteristics set forth above. This results in a composite picture and lenticular screen in which the manufacturing tolerances of the screen may be held to extremely close limits thereby resulting in an optical system fully capable of producing the necessary results.

With a lenticular screen of the type under consideration having lenses provided with an aspherically curved front surface to fully correct for spherical aberration, the light rays entering or leaving each lens between given limits to each side of the optical axis will focus or emanate from points lying along a curved line to the rear of the lens and consequently, for an optimum lens of this type it is desirable to provide a curved rear surface coinciding with such points and in one form of the invention it is proposed to provide such a curved rear surface. However, it has also been found that a perfectly practical and acceptable lenticular screen having this type of lens may be provided with a flat rear surface to the rear of each lens, such surface being disposed in a location which represents an average of the maximum variation of the focal points involved and while this does not provide an optimum structure, as mentioned above, nevertheless, the same is perfectly practical and provides a sharp clear picture having the desired characteristics and such a screen is far less costly and less difficult to manufacture than a screen having curved rear surfaces opposite each lenticle and to which the photograph or printed picture is bonded.

It is accordingly an object of this invention to provide a lenticular screen fully corrected for spherical aberration and also providing a wide viewing angle of the order of thirty degrees to each side of the optical axis of each lenticle of the screen.

A further object of the invention is the provision of a lenticular screen fully corrected for spherical aberration and providing a wide viewing angle of the order of thirty degrees to each side of the optical axis of each lenticle and in which adjacent lenticles are so positioned as to eliminate interference at wide viewing angles.

A still further object of the invention is the provision of a lenticular screen fully corrected for spherical aberration and providing a wide viewing angle of the order of thirty degrees to each side of the optical axis of each lenticle and in which light rays entering or leaving each lenticle within these limits will focus or emanate from points coinciding with the rear surface of each lenticle.

Another object of the invention is the provision of a paper thin flexible lenticular screen having a thickness not greater than .020 inch, the screen being fully corrected for spherical aberration and in which each lens has a focal length not greater than .020 inch to provide a viewing angle of the order of thirty degrees to each side of the optical axis of each lenticle, the screen being formed of a material providing extreme flexibility of the order of magazine cover material and at the same time being highly resistant to abrasion or other damage and having a relatively high index of refraction thereby permitting the provision of an extremely thin lenticular screen.

A further object of the invention is the provision of a paper thin flexible lenticular screen having a thickness not greater than .020 inch, each lenticle of the screen having an aspherically curved front surface to fully correct for spherical aberration and each lenticle having a focal length not greater than .020 inch to provide a viewing angle of the order of thirty degrees to each side of the optical axis of each lenticle, the rear surface of each lenticle being curved to coincide with the points of focus of the lenticle at all viewing angles.

A still further object of the invention is the provision of a paper thin flexible lenticular screen having a thickness not greater than .020 inch, each lenticle of the screen being fully corrected for spherical aberration by the provision of an aspherically curved front surface on each lenticle, each lenticle having a focal length not greater than .020 inch to provide a viewing angle of the order of thirty degrees to each side of the optical axis of each lenticle, the rear surface of each lenticle being flat and being disposed at a location representing the average between the maximum variation of the points of focus at all viewing angles.

Another object of the invention is the provision of a flexible lenticular screen having a thickness not greater than .020 inch, each lenticle having a focal length not greater than .020 inch, the material of the lenticular screen having an index of refraction of the order of 1.52 and each lenticle being fully corrected for spherical aberration by the provision of an aspherically curved front surface.

A further object of the invention is the provision of a paper thin flexible wide angle lenticular screen provided as a laminated coating on a sheet of paper or similar material with the screen having substantially the same flexibility as the paper and in which the paper may carry a photograph or printed graphic representation on one surface thereof to be viewed through the laminated lenticular screen thereby providing a composite photograph and lenticular screen.

A still further object of the invention is the provision of a method of making a paper thin flexible wide angle lenticular screen in which the material forming the screen is laminated or coated on the surface of a sheet of paper and in which a convex aspherical front surface is formed for each lenticle of the screen and in which a concave rear surface for each lenticle is formed, both of such surfaces being simultaneously embossed by rollers or dies with the rear surface being formed or embossed to the paper laminated to the screen.

Another object of the invention is the provision of a method of making a paper thin flexible wide angle lenticular screen in which the material forming the screen is laminated or coated on the sheet of paper and in which a convex aspherically curved front surface is formed for each lenticle of the screen, such surface embossed by a roller or die subsequent to application of the material to the paper.

A further object of the invention is the provision of an apparatus for making a composite laminated flexible lenticular screen and sheet of paper, including a roll for applying a plastic to the sheet of paper and a chilled forming cylinder for embossing a lenticular screen on the surface of the plastic.

A still further object of the invention is the provision of an apparatus for making a composite laminated flexible lenticular screen and sheet of paper including a heated coating roll for applying a melted plastic of a predetermined thickness to the sheet of paper and a chilled forming cylinder for embossing a lenticular screen in the plastic.

Another object of the invention is the provision of an apparatus for making a composite laminated flexible lenticular screen and sheet of paper, including means for applying a coat of plastic of predetermined thickness on a sheet of paper, a chilled forming cylinder for embossing a lenticular screen in the surface of the plastic, the paper being fed to the coating and forming rolls of the cylinder in the form of a continuous web.

Figure 2:
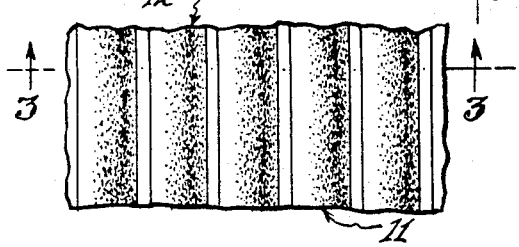

Further objects and advantages of the invention will be apparent from the following description taken in conjunction with the accompanying drawings wherein:

FIG. 1 is a diagrammatic view to a greatly enlarged scale showing one lenticle of a lenticular screen constructed in accordance with this invention and with a portion of the adjacent lenticle being shown, this figure including only the front portion of the lenticle, together with the traces of light rays passing through the lenticle at various viewing angles, as well as the construction lines;

FIG. 1A a diagrammatic view forming a continuation of FIG. 1 at the same greatly enlarged scale and showing the rear portion of the lenticle together with continuations of the ray traces and such other values as are necessary to the design and construction of the lenticular screen of this invention;

FIG. 2 a fragmentary plan view to an enlarged scale and showing the appearance of the front surface of the lenticular screen and particularly the elongated parallel lenticles together with the spacing therebetween;

FIG. 3 a fragmentary sectional view taken substantially on the line 3—3 of FIG. 2 and showing a composite sheet of paper and lenticular screen bonded together and constructed in accordance with this invention;

FIG. 4 a diagrammatic view to a greatly enlarged scale showing one lenticle of a slightly modified form of lenticular screen constructed with this invention and with a portion of adjacent lenticles being shown, this form of lenticular screen having a flat rear surface opposite each lenticle;

FIG. 5 a fragmentary plan view to an enlarged scale showing the front surface of the lenticular screen of FIG. 4 and particularly the elongated parallel lenticles with the spacing therebetween;

FIG. 6 a fragmentary sectional view taken substantially on the line 6—6 of FIG. 5 and showing a composite sheet of paper and lenticular screen bonded together and constructed in accordance with the form of the invention shown in FIG. 4;

FIG. 7 a diagrammatic view in elevation showing an apparatus for making a composite laminated lenticular screen and sheet of paper in accordance with this invention with the paper being supplied as separate sheets from a stack; and FIG. 8 a diagrammatic view in elevation similar to FIG. 7 and showing an apparatus for making a composite laminated lenticular screen and a set of paper in accordance with this invention with the paper being supplied from a roll as a continuous web.

With continued reference to the drawings there is shown in FIGS. 1, 1A and 2 a lenticular screen constructed in accordance with this invention and for convenience of illustration, these figures are drawn to a scale of approximately one thousand to one. The lenticular screen 10 may be formed from a suitable plastic which has been found to have the necessary properties of flexibility, resistance to abrasion or other damage and a relatively high index of refraction of the order of 1.52 such as a plastic material of the type which can be rendered fluent by application of heat and can be solidified by cooling. But, of course, other suitable materials may be utilized provided all of the necesssary properties are inherent therein. The lenticular screen 10 may include as many lenticles 11 as necessary, but for convenience of illustration, there is shown only the lenticle 11 and a portion of the adjacent lenticle 12. It will be understood, of course, that all lenticles in the screen are of identical optical characteristics and that as shown in FIG. 2, they are elongated and disposed in parallel relationship.

The front portion 13 of the lenticle 11 is convex and takes the form of an aspheric curve obtained from suitable formulas as set forth below. Since each lenticle of the lenticular screen of this invention provides a unitary one-piece simple lens having a relatively short focal length of not greater than .020 inch and since in this type of lens it is only possible to correct for spherical aberration by proper design of the front surface of the lens, the aspheric curve providing the front portion 13 of the lenticle 11 serves to fully correct the lenticle for spherical aberration with the result that all light rays emanating from the lenticle within the viewing angle limits of thirty degrees to each side of the optical axis will be collimated or parallel to the optical axis of the lenticle.

The following formulas are presented as a specific example of the manner in which the aspheric curve forming the front surface of each lenticle may be calculated and also provides a comparison between the conventional formula for an ellipse and the formula applicable to this invention.

Although all parabolas have the same basic shape and dipper only as to the scale on which they are constructed, the same is not true of ellipses.

The shape of the ellipse may vary from shapes that appear almost circular to shapes which degenerate into or approach a straight line.

Therefore, we have as another feature of the ellipse its eccentricity which is the degree of non-roundness or flatness, or in other words, the relation in percentage of the minor axis to the major axis and may be expressed numerically as the ratio $$e = \frac{c}{a}$$

where $c$ and $a$ are the leg and hypotenuse of a right triangle in the first quadrant of the ellipse or, since the other leg of the same right triangle equals $b$ and $c$ equals $$\sqrt{a^2 - b^2}$$

$$e = \frac{\sqrt{a^2 - b^2}}{a} = \sqrt{1 - \frac{b^2}{a^2}}$$

The eccentricity of a true ellipse, ($e$) is always between 0 and 1, when $e$ is close to 0 in value the ellipse is nearly circular, but when $e$ is close to 1 in value the ellipse is relatively long and flat.

Assuming the foci of an ellipse to be $F_1$ ($c$, $o$) and $F_2$ ($-c$, $o$), the total distance to $F_1$ and to $F_2$ from any point $P$ ($x$, $y$) on the ellipse to be $2a$, and half the minor axis to be $b$:

$$(F_1P) + (PF_2) = 2a$$

but $$(F_1P) = \sqrt{(x-c)^2 + y^2}$$
$$(PF_2) = \sqrt{(x+c)^2 + y^2}$$

so that $$\sqrt{(x-c)^2 + y^2} + \sqrt{(x+c)^2 + y^2} = 2a$$
$$\sqrt{(x-c)^2 + y^2} = 2a - \sqrt{(x+c)^2 + y^2}$$
$$x^2 - 2cx + c^2 + y^2 = 4a^2 - 4a\sqrt{(x+c)^2 + y^2}$$
$$+ x^2 + 2cx + c^2 + y^2$$
$$a\sqrt{(x+c^2+y^2} = \lambda^2 + cx$$

transposing and dividing by 4=4

$$\lambda^2X^2 + 2\lambda^2cx + \lambda^2C^2 + \lambda^2y^2 = \lambda^4 + 2a^2cx$$
$$+ c^2x^2(a^2-c^2)x^2 + a^2y^2 = a^2(a^2-c^2)$$

but $$\lambda^2 - c^2 = b^2$$

therefore $$b^2x^2 + a^2y^2 = \lambda^2b^2$$

which represents the conventional formula for an ellipse.

Since the above steps may be reversed, we have as the analytic equivalent of an ellipse with foci $F_1$ ($c$, $c$) and $F_2$ ($-c$, $o$), major axis=$2a$ and minor axis=$2b$.

For the conditions of this invention the constants $a$ and $b$ are established by two conditions as follows:

$$\frac{b^2}{a} = R$$

in order to obtain the required lens power paraxially.

Secondly, the slope of the marginal ray from $y=b$ must satisfy the condition $$\tan \alpha^1 = \frac{b}{\frac{NR}{N-1}} - a$$

where N=index of refraction of lens material.

Given a focal length of 8.585 and an index of refraction of the material of 1.52 the eccentricity of the ellipse that satisfies these conditions simultaneously was solved for and found to be 0.65789347, and therefore, the formula becomes $$15.21x^2 + 26.817y^2 = 407.8888$$

In order to avoid handling many zeros between the decimal point and significant figures, the entire lenticle was scaled up by a factor of 1000; consequently, for all linear dimensions, the figures indicated must be divided by this same factor to obtain the actual values.

The coordinates for the aspheric curve have been calculated in steps of 0.2 unit for $(a-x)$. Thus, the point A in FIG. 1 of the drawing represents the zero reference point, rather than the point 0 about which the ellipse is symmetrical.

The following table provides these coordinate values.

| $(a-x)$ | $y$ | Tan $\theta$ | $\theta$ (in degrees) |
|---|---|---|---|
| 0 | 0 | 0 | 0 |
| .2 | 1.0734 | | |
| .4 | 1.5030 | .5545596 | 29.01082 |
| .6 | 1.8222 | | |
| .8 | 2.0824 | | |
| 1.0 | 2.3037 | .9720442 | 44.18782 |
| 1.2 | 2.4965 | | |
| 1.4 | 2.6669 | | |
| 1.6 | 2.8190 | | |
| 1.8 | 2.9557 | | |
| 2.0 | 3.0788 | 1.7078072 | 59.64906 |
| 2.2 | 3.2167 | | |
| 2.4 | 3.2911 | | |
| 2.6 | 3.3821 | | |
| 2.8 | 3.4643 | | |
| 3.0 | 3.5381 | 2.863455 | 70.74934 |
| 3.2 | 3.6195 | | |
| 3.4 | 3.6628 | | |
| 3.6 | 3.7144 | | |
| 3.8 | 3.7589 | | |
| 4.0 | 3.7977 | 5.6815167 | 80.01767 |
| 4.2 | 3.8267 | | |
| 4.4 | 3.8557 | | |
| 4.6 | 3.8756 | | |
| 4.8 | 3.8896 | | |
| 5.0 | 3.8977 | 38.493433 | 88.51188 |
| 5.1785275 | 3.9 | $\infty$ | 90.00000 |

(A) Then $$1w/2 = 3.900$$

(A) = $1w/2$
(B) = dimension to nodal point
$1w$ = lenticle width
$N^1 = 1.52$
$fB$ = back focus
$F_1$ = point of origin
$F_2$ = point of intersection (same as $fB$ for $\infty$ rays)
$\infty$ = rays from infinity
(B) Therefore:

$$(A)_x^2 + (B)_y^2 = x$$

$$\left\{\frac{\sqrt{15.21_x^2}}{(3.900)} + \frac{\sqrt{26.817147_y^2}}{(5.1785275)}\right\} = 407.8888$$

$$fB = \frac{(B)}{N^1} + (B) : \sqrt{\frac{26.817147}{1.52}} = \sqrt{26.817147}$$

$$fB = \frac{5.1785275}{1.52} + 5.1785275$$

$$fB = 3.407 + 5.1785275$$

$$fB = 8.5855275$$

and:

$3.407 \equiv$ (1) dimension from nodal point of lens to $F_1$
(2) dimension from nodal point of lens to $F_2 \equiv fB$ The slope of the normal rays for the points of refraction $\theta$ has also been calculated, and were used in a graphical plot for checking and proving results.

Considering slope of normals:

$$\frac{15.21_{y_1}}{26.817147_{x_1}} \equiv \tan \angle \theta$$

$$\tan \angle \theta = \frac{y_1}{x_1}$$

$$\angle \theta = 30° \equiv \text{slope of normals}$$

checking graphically:

All rays of light $\infty$ entering face of aspheric curve at 0° will be brought to a focus at $fB \equiv F_2$. This can be confirmed by ray or victor tracing rays emanating from $F_1$ (internal) which may be seen to travel and be refracted from points $B_1 C_1 D_1 E_1 F_1 G_1$ and then all intersect at $F_2$.

The confirming evidence is that each of these individual rays will travel an exact same distance, thus proving the design to be correct by graphic projection.

FIG. 1A shows that the rear portion 14 of the lenticle 11 is provided with a concave rear surface 15 and the curvature of this surface is determined graphically in such a manner that all parallel light rays entering or leaving the lenticle 11 between the limits of thirty degrees to one side of the optical axis and thirty degrees to the opposite side of the optical axis will focus or emanate from points coinciding with the rear surface 15. Thus from a viewing angle of zero degrees or with the viewer located on the optical axis, the maximum usable aperture of the lenticle will be the width of the lenticle and all light rays will focus at the point $F_2$ as shown in FIG. 1A. With the viewing angle to either side of the optical axis, the rays will also focus on a point coinciding with the surface 15, but to one side or the other point $F_2$. The maximum aperture of the lenticle 11 at fifteen degrees and thirty degrees from the optical axis is shown by the lines indicated by the legend in FIG. 1 and thus, the maximum usable aperture at fifteen degrees is indicated by the line $L_1$ and the maximum usable aperture at thirty degrees is indicated by the line $M_1$. As stated above, the maximum usable aperture at the optical axis is the full width of the lenticle.

Since it is highly desirable in lenticular screens of this type to preclude interference between adjacent lenticles and since a wide viewing angle is provided by the use of a relatively short focal length of not greater than .020 inch it is necessary to avoid interference between adjacent lenticles and for this purpose, it will be seen from an inspection of FIGS. 1 and 1A that the lenticle 12 is spaced from the lenticle 11 a distance indicated by the line Z and it has been determined that the optimum value for this spacing is of the order of twelve and one-half percent of the width of each lenticle. However, this spacing may, for various designs, lie between the limits of ten percent and fifteen percent of the width of each lenticle and it will be seen from an inspection of FIG. 1 the extreme outside light ray at a viewing angle of thirty degrees lies just outside of the front surface of the lenticle 12 and consequently, interference with such light ray is precluded.

As was stated above, it is extremely important in the application contemplated for the lenticular screen of this invention that the same be extremely thin or of the order of the thickness of cover material of a magazine and it has been found that suitable plastic may be utilized for this purpose and that the index of refraction of such material is such that a lenticular screen having a maximum thickness of the order of eight and one-half one thousandths of an inch is entirely practical and the invention also contemplates the provision of lenticular screens which also may be considered as being relatively thin and as having a thickness not greater than .020 inch. Consequently, there has been provided by this invention a lenticular screen which may be applied to and form a part of a sheet of paper without materially reducing the flexibility of such sheet of paper. Since such a material may be utilized this also contributes materially to the ease of manufacture of the lenticular lens of this invention and there is shown in FIG. 3 to a greatly enlarged scale a cross section of a composite lenticular screen and sheet of paper in which the sheet of paper may be a photograph or contain a suitably printed graphic representation. As shown in FIG. 3, the lenticular screen 16 is provided with a plurality of lenticles 17, each of which has a convex front surface 18 in the form of an aspheric curve obtained as the result of the calculations described above and with a concave rear surface 19 formed as described above. The paper sheet 20 is laminated and bonded to the back or rear surface of the lenticular screen 16 and forms a composite structure.

With particular reference to FIGS. 4, 5 and 6, there is shown a slightly modified form of lenticular screen constructed in accordance with this invention and referring particularly to FIG. 4, there is shown a lenticular screen 21 which may be formed of a suitable plastic and in this figure one complete lenticle 22 is shown, while a portion of the adjacent lenticles 23 and 24 are also shown. It is to be noted that lenticles 23 and 24 are spaced from lenticle 22 a distance as indicated by the lines $Z_1$. This spacing is for the same purpose as the spacing between the lenticles in the form of the invention above described and shown in FIGS. 1 to 3.

In the form of the invention shown in FIG. 4, the front surface 25 of each lenticle is formed as an aspheric curve in the same manner as the previously described lenticle but whereas the previously described lenticle was provided with a curved rear surface, the rear surface 26 of the lenticle shown in FIG. 4 is flat. As shown in FIG. 4, light rays emanating from a point on the optical axis of the lenticle at the rear surface 26 will be collimated from the lenticle in parallel rays as indicated by the lines in FIG. 4, but for light rays emanating at a point other than on the optical axis, such point will not fall directly on the rear surface 26, but will be slightly inwardly or outwardly thereof. As a consequence, the rear surface 26 has been located in accordance with the average of the distance between hte furthermost inner and outer focal points and while this represents somewhat of a compromise, nevertheless, the results are perfectly satisfactory and as a practical matter, this particular design of lenticular screen is perfectly suitable for commercial adaptations and obviously, is more economical to manufacture than the screen described above having curved rear surfaces. As before the spacing between adjacent lenticles prevents interference with light rays and consequently permits the maximum viewing angle provided by the design of the lenticle, such viewing angle being dictated primarily by the focal length of the lenticle, which as stated above is not greater than .020 inch. As shown in FIG. 5 the lenticles 22, 23 and 24 are elongated and disposed in parallel relationship.

In this form of the invention the lenticular screen 21 is also made extremely thin and having a thickness not greater than .020 inch, but a thickness of the order of eight and one-half one thousandth of an inch is entirely practical and may be utilized and as shown in FIG. 6 to a greatly enlarged scale, a composite structure may be provided by laminating and bonding the lenticular screen 21 along the rear surface 26 thereof to a sheet of paper 27 and the resulting structure will possess sufficient flexibility to be utilized in magazines or other periodicals and also in greeting cards or the like.

In the manufacture of the composite lenticular screen and paper sheet as shown in FIGS. 3 and 6, the plastic for forming the lenticular screen 16 or 21 may be applied to the surface of the paper 20 or 27 in the form of a coating by spraying, rolling or by any other suitable process and the resulting composite sheet will be extremely flexible and, of course, since the plastic coating is transparent a picture on the surface of the paper sheet 20 or 27 will be clearly visible therethrough. However, since it is assumed that the picture on the paper sheet has been made through a lenticular screen in order to provide a three dimensional stereoscopic photograph, it is necessary to view such picture through a lenticular screen of suitable optical characteristics in order to render visible the three dimensional or stereoscopic effect.

It is also to be noted that while the spacing of the lenticles as described above permits relatively wide angle off axis viewing without interference between adjacent lenticles, this spacing is also advantageous, in that a greater area is provided behind each lenticle for receiving image information. This image information is applied to the paper sheet in the form of at least ten juxtaposed images behind each lenticle and since such images are normally reproduced with half-tone dots on conventional printing equipment, the added available image information area on the paper sheet results in a reproduction of higher quality than is possible where the available image information area is limited to the width of one lenticle. This additional image information receiving surface available as a result of the spacing of the lenticles precludes the necessity for utilizing a relatively wide lenticle which would necessarily have a long focal length and a narrower viewing angle and also would require a thicker plastic coating on the paper sheet which, of course, in view of the requirement for flexibility is undesirable.

The paper sheets 20 or 27 as mentioned above, may be of the sensitized variety in order to directly print a picture thereon by photographic processes, but, of course, if desired, such picture or other material may be applied to the sheet of paper by an ordinary ink printing process and the plastic coating thereafter applied to the printed sheet and the lenticular screen formed thereon in a manner to be presently described. As a result, this process, is clearly applicable to large scale printing operations and results in the production of a flexible sheet having a photograph or other material thereon and in which such photograph or material may be viewed through the lenticular screen formed integral therewith in order to provide a three dimensional or stereoscopic effect.

Since the lenticular screen of this invention as applied to the sheet of paper has been fully corrected for spherical aberration and also provides wide angle off axis viewing, it will be seen that a pleasing view of the picture or other material may be had from any position within reasonable limits and obviously, it is not necessary for the viewer to be situated on the optical axis of a lenticle or in fact, even close to such optical axis.

The plastic coating on the paper sheet 20 of FIG. 3 may be conveniently formed as a lenticular screen of the desired optical characteristics by simultaneously embossing the front and rear surfaces of the lenticular screen 16 and, of course, a front embossing roller or die of suitable configuration will be employed to form the aspheric curve for the convex front surface 18 of each lenticle 17. Simultaneously therewith a rear embossing roller will engage the rear surface 28 of the paper sheet 20 and emboss therein and at the same time in the rear surface of the lenticular screen 16, the concave surfaces 19 on each lenticle 17. Since the focal points of each lenticle 17 follow the curvature of the concave rear surface 19, it will be seen that by the use of this embossing process that the picture on the paper 20 will lie in contact with the concave surface 19 and consequently, all portions of the picture as viewed through the lenticular screen will be in sharp focus in a clear sharp image as viewed through the lenticular screen 16.

With particular reference to FIG. 7 there is shown diagrammatically an apparatus which may be utilized for making a composite laminated flexible lenticular screen and sheet of paper of the type described above in connection with FIGS. 4 to 6 and for this purpose there may be provided a suitable plastic applying coating roll 29 to the surface of which may be supplied a suitable quantity of melted plastic. A doctor blade 31 engages the plastic 30 and serves to distribute the same in a layer of uniform thickness on the coating roll 29 and this serves to determine the thickness of the plastic coating applied to the sheet of paper. Disposed in spaced parallel relationship to the coating roll 29 is a pressure roll 32 and disposed in spaced parallel relationship to the pressure roll 32 is a chilled forming or embossing cylinder 33. The cylinder 33 may be chilled by any suitable refrigerating means as by circulating a refrigerated fluid through the interior of the cylinder 33.

In operation, a sheet of paper 34 may be fed by any suitable means from a stack 35 of such paper sheets between the coating roll 29 and the pressure roll 32, at which time a melted plastic coating of a predetermined thickness will be applied to the paper sheet 34. The sheet 34 with the plastic coating 36 applied thereto passes between the pressure roll 32 and the forming or embossing cylinder 33 which forms the lenticles of the surface of the plastic coating 36 and due to the chilled condition of the forming or embossing cylinder 33 sets the plastic coating to maintain the configuration of the lenticular screen formed therein. The composite sheet of paper and lenticular screen 37 is then delivered to a stack 38 for storage or other use.

FIG. 8 diagrammatically shows an apparatus similar to that described above and shown in FIG. 7, the only difference being that a paper sheet 39 in the form of a continuous web is supplied from a roll 40 of such paper and after passing between the coating roll, the pressure roll and the forming or embossing cylinder, the composite web comprising the sheet of paper and embossed plastic 41 is delivered to a roll 42 for storage or other use.

The apparatus described above has been found to be entirely practical for coating a plastic on a sheet of paper and forming a lenticular screen of suitable and accurate optical characteristics thereon and at a rate which permits high speed production, thereby maintaining the cost of production at a minimum.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:
1. A thin flexible lenticular screen unit comprising:
a sheet formed of plastic material of the type which can be rendered fluent by application of heat and can be solidified by cooling, said plastic material having an index of refraction of the order of 1.52;
said sheet having forward and rear surfaces spaced apart by a distance not greater than 0.020 inch which forms the thickness of the sheet;
said sheet forward surface being formed into a plurality of elongated parallel lenticles, each of which forms a unitary lens;
each of said lenses having a central optical axis and a focal length not greater than 0.020 inch with the focal length of each lens being correlated with the thickness of the sheet so that each lens focuses substantially at said rear surface of said sheet;
a backing sheet capable of carrying an image to be viewed through said lenticles, said backing sheet being adhered directly to said rear surface of said sheet so that said lenticles focus substantially thereon;
said lenticles being aspherically curved in cross-section and being spaced apart from one another by a predetermined distance so that any particular lenticle is spaced away from the adjacent lenticles on either side thereof to maximize the angular distance to each side of said optical axis of said particular lenticle through which all parallel light rays can enter or leave to focus on or emanate from points on said backing sheet.

2. A thin flexible lenticular screen unit as defined in claim 1 wherein the aspheric curvature of said lenticles fully corrects for spherical aberration.

3. A thin flexible lenticular screen unit as defined in claim 1 wherein said predetermined distance is of the order of ten to fifteen percent of the width of each lenticle.

4. A thin flexible lenticular screen unit as defined in claim 1 wherein said angular distance to each side of the optical axis is thirty degrees.

5. A thin flexible lenticular screen unit as defined in claim 1 wherein said screen has a thickness of the order of eight and one-half one thousandths of an inch.

6. A thin flexible lenticular screen unit as defined in claim 1 wherein said rear surface is flat.

7. A thin flexible lenticular screen unit as defined in claim 1 wherein said rear surface is concavely curved behind each lenticle.

8. A thin flexible lenticular screen unit as defined in claim 7 wherein the relationship between the aspheric curvature of the lenticles on said forward surface and the concave curvature of said rear surface is such that all parallel light rays entering or leaving each lens between the limits of thirty degrees to one side of said optical axis and thirty degrees to the opposite side of said optical axis will focus on or emanate from points on said backing sheet.

References Cited

UNITED STATES PATENTS

| | | | |
|---|---|---|---|
| 2,268,351 | 12/1941 | Tanaka | 350—167 |
| 2,279,825 | 4/1942 | Kaszab | 350—167 |
| 2,361,347 | 10/1944 | Brown | 88—1 |

FOREIGN PATENTS

| | | | |
|---|---|---|---|
| 310,161 | 7/1933 | Italy | 350—167 |
| 666,222 | 2/1952 | Great Britain | 350—167 |

JOHN T. GOOLKASIAN, Primary Examiner

R. A. KILLWORTH, Assistant Examiner

U.S. Cl. X.R.

117—11; 161—4, 6, 123; 350—128, 167